3,620,600

| | | | |
|---|---|---|---|
| [72] | Inventor | Victor L. Lindberg |
| | | Northville, Mich. |
| [21] | Appl. No | 33,446 |
| [22] | Filed | Apr. 30, 1970 |
| [45] | Patented | Nov. 16, 1971 |
| [73] | Assignee | Ford Motor Company |
| | | Dearborn, Mich. |

[54] LENS WITH FACETS FOR PROJECTING LIGHT ALONG DIFFERENT AXES
2 Claims, 14 Drawing Figs.

[52] U.S. Cl. .................................... 350/167, 240/106.1, 350/194
[51] Int. Cl. .................................... G02b 27/00
[50] Field of Search. ......................... 350/167, 213 194; 240/106.1

[56] References Cited
UNITED STATES PATENTS

| | | | | |
|---|---|---|---|---|
| 3,222,516 | 12/1965 | Miles | | 350/167 X |
| 3,004,470 | 10/1961 | Ruhle | | 350/194 |
| 2,915,843 | 12/1959 | Pabst et al. | | 350/167 X |

*Primary Examiner*—John K. Corbin
*Attorneys*—John R. Faulkner and William E. Johnson ABSTRACT: An improved lens for a signal device which projects a signal along a roadway is constructed as follows. A light-transmitting member is provided which has inner and outer faces. The inner face of the member has a plurality of facets formed thereon. A first portion of the facets project a signal from the lens along a first axis directed down the roadway and a second portion of the facets project a signal beyond the outer face of the lens along a second axis directed down the roadway. The first and second axes along which the signals from the lens are projected are spaced vertically from one another whereby the operator of a vehicle approaching the signal device at a first distance above the highway will be warned by the signal projected along the first axis and the operator of a motor vehicle positioned a second distance above the highway will be warned by the signal projected along the second axis.

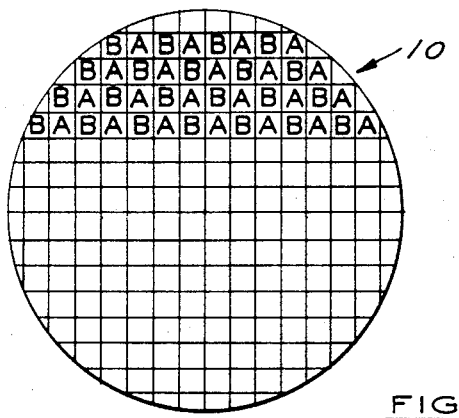
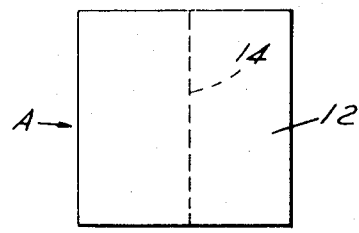
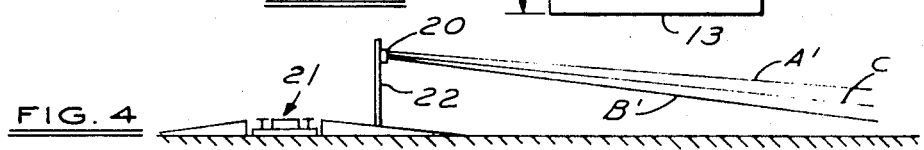
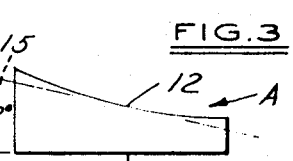
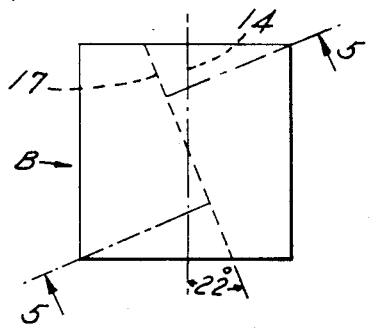
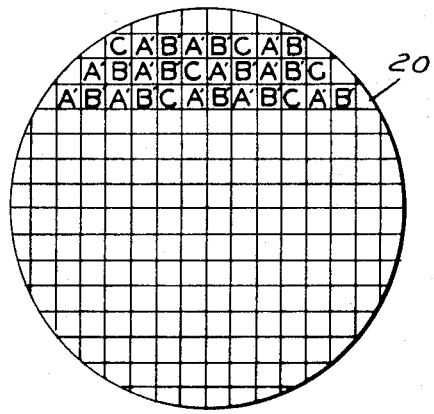
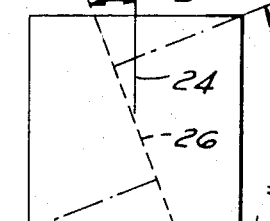
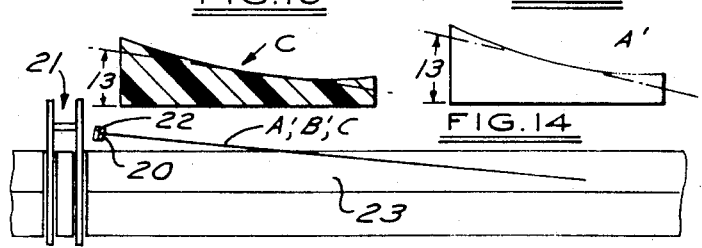
INVENTOR
VICTOR L. LINDBERG
BY John R. Faulkner
William E. Johnson
ATTORNEYS

LENS WITH FACETS FOR PROJECTING LIGHT ALONG DIFFERENT AXES

BACKGROUND OF THE INVENTION

In the construction of present day signal devices utilized, for example, as railroad crossing signals, much of the light projected therefrom is projected in a nonuseful manner. More particularly, much of the light projected from present day signal devices is projected into areas where people are not normally approaching the signal device. This projected signal light is thus wasted and not used in a warning function.

Another feature lacking in present day signal devices is that such devices do not compensate for the different heights of vehicles which traverse the roadways approaching the devices. For example, the operator of a sports car is seated at one effective distance above the roadway whereas the operator of a large truck is positioned at a different effective distance above the roadway. Generally, the signal devices of present day construction have been developed only for one uniform or average height of vehicle operators above the roadway and thus do not efficiently warn the driver of a higher or lower than normal height vehicle.

The improved lens for a signal device formed in accordance with the teachings of this invention eliminates the foregoing disadvantages by specialized placement of the signal light directed through the lens. More particularly, the lens is of such a construction that light generally directed to an area where people are not normally approaching the signal device is redirected to an area in which people are approaching the signal device. Also, the lens structure is so designed that the signal light emitted therefrom is projected down the roadway approaching the signal device along various axes more carefully coordinated with the height of drivers of vehicles operating over the roadway approaching the device. For example, a portion of the signal light is projected from the lens down the roadway from the signal device along a first axis coordinated with the height of a person above the roadway who is operating a standard size vehicle. The lens also projects a portion of the signal light down the roadway along an axis coordinated for the height of someone above the roadway who is operating a normal size truck. Even greater division of the axes along which the signal light is projected down the highway may be had if such is desired.

SUMMARY OF THE INVENTION

This invention relates to an improved lens for use in a signal device and, more particularly, for an improved lens for use with a signal device of the type which projects a warning signal in a direction along a roadway approaching the signal device. The roadway is one which is traversed by motor vehicles in which the operators thereof are positioned at different distances above the roadway.

The improved lens structure of this invention includes a member formed of a light transmitting material, the member having an inner face and an outer face. The inner face of the member has a plurality of facets formed thereon. At least a first plurality of the facets project light beyond the outer face of the lens along a first axis directed down the roadway in the direction of an approaching vehicle. A second plurality of the facets project the light beyond the outer face of the lens along a second axis directed down the roadway in the direction of an approaching vehicle. The first and the second axes along which the light is projected are vertically separated by an angle substantially less than 90° of arc. In such a manner, the operator of a vehicle who is positioned at approximately a first distance above the roadway is warned by the light projected along the first axis and the operator of a vehicle who is positioned approximately a second distance above the roadway is warned by light projected along the second axis.

In greater detail, the lens may be so constructed that light is projected therefrom along three axes for warning vehicle operators positioned at three different distances above the roadway. Also, the amount of light projected along a particular axis, of the total amount of light projected from the lens, may be controlled to represent the frequency of use of that axis. For example, in a lens projecting light along three axes, a smaller portion of the light may be projected along the center axis as there would be an overlap of light from the light projected along the other two axes.

BRIEF DESCRIPTION OF THE DRAWINGS

FIG. 1 is a diagrammatic view showing the construction of a lens in accordance with a first embodiment of the teachings of this invention.

FIGS. 2, 3, 4 and 5 show plan and elevation views of the construction of the facets utilized in the lens of FIG. 1.

FIG. 6 is the diagrammatic view showing the construction of a lens in accordance with the teachings of a second embodiment of this invention.

FIGS. 7, 8, 9, 10, 11 and 12 show plan and elevation views of the construction of the facets used in the lens of FIG. 6.

FIGS. 13 and 14 are, respectively, elevation and plan views of a signal device employing the lens of FIG. 6 therein.

DESCRIPTION OF THE PREFERRED EMBODIMENT

In FIG. 1 there is shown a lens, generally identified by the numeral 10, which lens is formed in accordance with the teachings of a first embodiment of this invention. The lens is formed from a light-transmitting material such as a transparent plastic or glass and has inner and outer faces. The inner face of the lens has a plurality of facets which are identified by the letters A and B in FIG. 1. The facets A are formed to project the light from the front face of the lens along a first axis whereas the facets B are formed to project the light from the front face of the lens along a second axis.

The facets identified by the letter A are constructed in the manner shown in FIGS. 2 and 3. More particularly, in FIG. 2, facet A is shown in plan view as having an upper surface 12 which would be the inner face of the lens 10. The facet also has a lower surface 13 (FIG. 3) which would be the outer face of the lens. The facet A has a line element 14 which defines the center of the upper surface 12 of the facet. The upper surface 12 is in the form of the surface of a cylinder and the radius of curvature which defines the cylindrical surface is taken at a right angle to the line element 14. In the preferred case, the radius of curvature is 1.6 inches and the facet is one-half inch square.

A tangent 15 to the upper surface and perpendicular to the radius of curvature of the upper surface at the line element 14 makes a wedge angle of 13° for the facet A. This wedge angle is effective to deviate the light passing through the facets A of the lens to such a degree that the light will be projected from the side of a roadway, the position at which the signal device is mounted, along a direction which intercepts and then traverses a length of the associated roadway. The wedge angle of 13° is selected in order to project the light onto a two lane highway approaching a signal device in a case where the signal device containing the lens is offset from the roadway by a distance of 6 feet.

In FIGS. 4 and 5, the construction of facet B of the first embodiment structure is shown in detail. Facet B has the same dimensions as facet A except that the radius of curvature for the lens element is taken perpendicular to line element 17 which is both perpendicular to the normal to the outer face of the facet and offset vertically from the line element 14 by an angle of 22°. The offset of the line element 17 by this angle for facet B means that the light projected from the lens 10 after having passed through the facet B is offset in its projection axis down the roadway with respect to the light projected from the lens through the facet A. More particularly, the light projected from facet A will be projected along an axis higher above the roadway associated with the signal device than the light projected from facet B. In such a manner, light is projected from the lens along two selected axes which are vertically offset from one another. These axes are selected so that the light passing along the B axis will be viewed by drivers positioned in vehicles of normal construction, that is, standard automobile vehicles. The light passing along the A axis will be viewed by drivers of large vehicles such as trucks because the light projected along the A axis is offset upwardly from the light projected along the B axis. As the drivers approach the signal device, the resulting signal along any axis is brighter.

Thus, the improved lens of this invention in a first embodiment, when employed in a signal device, produces a signal which is projected along a pair of vertically spaced axes. The axes are so selected that a majority of those operating vehicles over the road approaching the signal will view the signal light on one or the other of the two axes. For example, people operating normal sized vehicles will view the signal device along a lower axis of two axes whereas people operating trucks will view the signal device along a higher axis of the two axes. Those operating other types of vehicles will, of course, wee the signal but the light intensity thereof will be reduced in accordance with the degree of offset from one of the two axes.

In FIG. 6, a second embodiment of an improved signal device lens is shown and the lens is generally identified by the numeral 20. This second embodiment of the lens is designed so as to project light along three separate axes from a signal device mounted, for example, at a railroad crossing. The positions of the three axes may be best understood by reference to FIGS. 13 and 14 in which a railroad crossing 21 is shown. The railroad crossing is protected by a signal device of normal construction which is designated by the numeral 22. The signal device 22 has the lens 20 contained therein. The signal device 22 projects the light generated by the device along a roadway 23 so as to warn drivers of approaching vehicles that a train is about to cross the crossing. As viewed in FIG. 13, three separate signal beams, designated from the top A', C and B', are projected along three vertically separated axes from the lens 20. However, as viewed in FIG. 14, it is seen that all three axes are aligned when viewed from above.

The particular construction of the lens element 20 will now be described in detail with reference to FIGS. 6 through 12. The lens 20 is formed from a plurality of facets designated A', B', and C in FIG. 6. The A' facet is shown in FIGS. 7 and 8. In these figures, it will be noted that the facet A', which is ½-inch square, is constructed in the same manner as facet A disclosed in FIGS. 2 and 3 and described in detail above. More particularly, the radius of curvature of the facet A' is taken perpendicular to the line element 24 of the defined cylinder and the radius is 1.6 inches. The wedge angle for the A' element is again 13° as it was in the case of facet A described in conjunction with the lens structure 10.

The B' facets are one-half inch square and are shown in FIGS. 11 and 12. The B' facet is constructed in the same manner as facet B disclosed in FIGS. 4 and 5. In this facet, the wedge angle is again 13°, and the line element 25 about which the radius of curvature of the facet B' is swept is offset from the line element 24 by an angle of 22°. This change in angle develops the different beam B' which is offset downwardly from beam A' as is shown in FIG. 13.

The C facets are also ½-inch square and are similar to the other facets in having a 13° wedge angle and a 1.6-inch radius of curvature. However, as shown in FIGS. 9 and 10, the line element 26 about which the radius of curvature for the facet C is swept is offset from the line element 24 by an angle of 11°. The offset in angle develops the different beam C which is projected along the C axis as shown in FIG. 13.

As will be best noted by reference to FIG. 6, the number of A' facets and B' facets are identical and consist of about 40 percent each of the total number of facets of the lens. The remaining facets, approximately 20 percent of the total, are the C facets. In this manner, the greater amounts of light are projected along the A' axis and B' axis and a reduced amount of light is projected along the C axis. The amount of light projected along the C axis is reduced because there is overlap of light from the other two axes. The lower axis B' is intended for drivers of sports cars and smaller cars. The C axis is intended for use by drivers of vehicles of standard or intermediate construction in which the vehicle operator is positioned at a little higher distance above the roadway than the smaller cars. The A' axis is intended for use by operators of large-type vehicles such as trucks.

Thus, there has been disclosed herein an improved signal lens for use in conjunction with a signal device. The lens projects the light passing through the lens along selected axes to make more advantageous utilization thereof.

The invention disclosed will have many modifications which will be apparent to those skilled in the art in view of the teachings of this specification. It is intended that all modifications which fall within the true spirit and scope of this invention be included within the scope of the appended claims.

I claim:

1. In a signal device for projecting a signal light in a direction along a roadway approaching the signal device, the roadway being traversed by motor vehicles which position the operators thereof at different distances above the roadway; an improved lens for the signal device which comprises: a light-transmitting material having an inner face and an outer face; said inner face being formed of a plurality of facet means, at least a first plurality of said facet means for projecting light beyond said outer face of said lens along a first projection axis, and at least a second plurality of facet means for projecting light beyond said outer face of said lens along a second projection axis; said facet means each being 0.5-inch square and being formed on said inner face of said lens in a plurality of aligned horizontal and vertical rows with alternate ones of said facet means in each of said horizontal and vertical rows being said first facet means; said projection axes of said first and second facet means being aligned on a vertical axis although being vertically spaced on that axis; each of said facet means having a surface defined by a portion of a cylinder having a radius of curvature of 1.6 inches taken about a selected axis, said selected axis for said second facet means being inclined at an angle of 22° with respect to said selected axis for the radius of curvature of said first facet means, whereby the operator of a vehicle who is positioned approximately a first distance above the roadway is warned of the signal by light projected along said first axis and whereby the operator of a vehicle who is positioned approximately a second distance above the roadway is warned of the signal by light projected along said second axis.

2. In a signal device for projecting a signal light in a direction along a roadway approaching the signal device, the roadway being traversed by motor vehicles which position the operators thereof at different distances above the roadway; an improved lens for the signal device which comprises: a light-transmitting material having an inner face ans an outer face; said inner face being formed by a plurality of facet means, at least a first plurality of said facet means for projecting said light beyond said outer face of said lens along a first projection axis directed down the roadway in the direction of an approaching vehicle, at least a second plurality of said facet means for projecting said light beyond said outer face of said lens along a second projection axis directed down the roadway in the direction of an approaching vehicle, and at least a third plurality of said facet means for projecting light beyond the outer face of said lens along a third projection axis directed down the roadway in the direction of an approaching vehicle; said first, second and third projection axes being vertically separated from one another by an angle substantially less than 90° of arc; wherein said axes of projection of said first, second and third facet means are aligned on a vertical axis although being vertically spaced on that axis; wherein said facet means are formed on said inner face of said lens in a plurality of aligned horizontal and vertical rows with said first facet means making up substantially 40 percent of said facet means, with said third facet means making up substantially 40 percent of said facet means and with said third facet means making up the balance of said means; each of said facet means being 0.5-inch square and having a surface defined by a portion of a cylinder having a radius of curvature taken about a selected axis, said selected axis for said second facet means being inclined at an angle of 11° with respect to said selected axis of said first facet means, and said selected axis for said third facet means being inclined at an angle of 22° with respect to said selected axis of said first facet means, whereby the operator of a vehicle who is positioned approximately a first distance above the roadway is warned of the signal by light projected along said first axis, whereby the operator of a vehicle who is positioned approximately a second distance above the roadway is warned of the signal by light projected along said second axis, and whereby the operator of a vehicle who is positioned approximately a third distance above the roadway is warned of the signal by light projected along said third axis.

* * * * *